(12) United States Patent
Boutaghou et al.

(10) Patent No.: US 6,445,541 B1
(45) Date of Patent: Sep. 3, 2002

(54) HIGH SUCTION AIR BEARING WITH PRESSURE RELEASE

(75) Inventors: Zine Eddine Boutaghou, Vadnais Heights; Dallas Wayne Meyer, Burnsville, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/206,017

(22) Filed: Dec. 4, 1998

Related U.S. Application Data

(60) Provisional application No. 60/078,840, filed on Mar. 20, 1998.

(51) Int. Cl.[7] .............................................. G11B 5/60
(52) U.S. Cl. ................................. 360/235.5; 360/235.4
(58) Field of Search ................ 360/246.6, 235.4–237.1, 360/235.3

(56) References Cited

U.S. PATENT DOCUMENTS

| | | | | |
|---|---|---|---|---|
| 2,937,240 A | * | 5/1960 | Harker | 360/234 |
| 3,123,677 A | * | 3/1964 | Lauxen et al. | 360/234.6 |
| 3,148,248 A | * | 9/1964 | Johnson | 360/230 |
| 3,213,461 A | * | 10/1965 | Goddard | 360/230 |
| 3,268,877 A | * | 8/1966 | Hagen | 360/230 |
| 3,631,425 A | * | 12/1971 | Tang | 360/234.6 |
| 3,676,874 A | * | 7/1972 | Turner | 360/244 |
| 3,913,138 A | * | 10/1975 | Stankiewicz et al. | 360/234 |
| 4,081,846 A | * | 3/1978 | Roscamp et al. | 360/103 |
| 4,814,906 A | * | 3/1989 | Suzuki et al. | 360/75 |
| 4,837,648 A | * | 6/1989 | Yamauchi | 360/235.4 |
| 5,276,573 A | * | 1/1994 | Harada et al. | 360/103 |
| 5,572,387 A | * | 11/1996 | Brooks, Jr. et al. | 360/104 |

FOREIGN PATENT DOCUMENTS

| | | | |
|---|---|---|---|
| JP | 56134354 | * | 10/1981 |
| JP | 60223088 | * | 11/1985 |
| JP | 63247962 | * | 10/1988 |

* cited by examiner

Primary Examiner—David Hudspeth
Assistant Examiner—Angel Castro (57) ABSTRACT

A disk drive system includes a base, a disk stack rotatably attached to the base, and an actuator assembly movably attached to the base. A ramp assembly includes a set of ramps for loading and unloading the sliders and transducing elements carried by the sliders to and from the disks in the disk stack. The ramp assembly is attached to the base. An actuator assembly is movably attached to the base of the disk drive. The actuator assembly includes one or more arms. A load spring is attached to the arm of the actuator. In some instances two load springs are attached to the arm of the actuator. A slider is attached to the load spring. Sliders have a backside surface and an air bearing surface. The air bearing surface includes an arrangement of rails and cavities which form high pressure areas and low pressure areas. An opening or passage connects the air bearing surface the backside surface of the slider. A ring of compliant material is attached to the backside surface of the slider. The ring of compliant material is located around the opening. Also associated with the actuator is a tang used primarily to unload or load the slider. The tang includes a dimple positioned to engage the ring of compliant material and to seal the opening on the backside surface of the slider. As the tang engages the ramp, the tang is moved so that the seal between the dimple and compliant ring around the opening is broken. The negative pressure area of the air bearing surface is pressurized.

12 Claims, 5 Drawing Sheets

HIGH SUCTION AIR BEARING WITH PRESSURE RELEASE

RELATED APPLICATION

This application claims the benefit of U.S. Provisional Application Serial No. 60/078,840, filed Mar. 20, 1998 under 35 USC119(e).

FIELD OF THE INVENTION

The present invention relates to the field of mass storage devices. More particularly, this invention relates to a slider for use in a disk drive which includes a ramp for loading and unloading a transducing head to and from the disk.

BACKGROUND OF THE INVENTION

Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 0.5–1.0 microinches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

Disk drives have actuator assemblies which are used to position the slider and transducer at desired positions with respect to the disk. The slider is attached to the arm of the actuator assembly. A cantilevered spring, known as a load spring, is typically attached to the actuator arm of a disk drive. The slider is attached to the other end of the load spring. A flexure is attached to the load spring and to the slider. The flexure allows the slider to pitch and roll so that the slider can accommodate various differences in tolerance and remain in close proximity to the disk. The slider has an air bearing surface ("ABS") which includes rails and a cavity between the rails. The air bearing surface is that portion of the slider that is nearest the disk as the disk drive is operating. When the disk rotates, air is dragged between the rails and the disk surface causing pressure, which forces the head away from the disk. At the same time, the air rushing past the depression in the air bearing surface produces a negative pressure area at the depression. The negative pressure or suction counteracts the pressure produced at the rails. The different forces produced counteract and ultimately fly over the surface of the disk at a particular fly height. The fly height is the thickness of the air lubrication film or the distance between the disk surface and the head. This film eliminates the friction and resulting wear that would occur if the transducing head and disk were in mechanical contact during disk rotation.

A constant goal of disk drive manufacturers is to increase the amount of information representing data that can be stored in a disk drive. One known way to increase data density is to lower the flying height of the slider. One way to lower the fly height is to use sliders having air bearing designs with larger areas which produce negative pressure. These designs are known as high suction air bearings. High suction bearings are very desirable since there is less variance in fly height when using a high suction bearing. The high suction air bearing sliders also have a relatively flat profile which means that the fly heights do not vary much when the slider is positioned at different radial positions. Overall, the high suction air bearing sliders have less altitude sensitivity.

Use of a high suction air bearing slider does have some drawbacks. One of the problems associated with high suction air bearing sliders is that when used in a disk drive where the slider and transducer are being loaded onto and unloaded off of the disk, the high suction force causes the air bearing surface to be subjected to an impulse loading which causes an excitation at the gimbal dimple and also may result in contact between the head and disk during unloading. The high suction force is not overcome until the load beam and arm are relatively far off the disk. As a result, the flexure is stretched out beyond its normal orientation. When the suction force is finally overcome, the slider is attached on the end of the flexure. This situation is like having a door spring attached to a door and pulling it well beyond the normal open position and then letting it go. The slider, like the door, will approach the gimbal dimple with too much force. The force of the stretched out flexure is much the same as the force associated with the door spring.

As a result, there is a need for a slider that will produce a high negative pressure while in transducing relation with respect to the disk. There is also a need for a slider which will release the high suction force early during the unloading process. Overcoming this problem will allow the use of high suction force air bearing sliders to be used on smooth disks without the problem of the slider either slapping the gimbal dimple or the slider exciting the gimbal dimple.

SUMMARY OF THE INVENTION

A disk drive system includes a base, a disk stack rotatably attached to the base, and an actuator assembly movably attached to the base. A ramp assembly includes a set of ramps for loading and unloading the sliders and transducing elements carried by the sliders to and from the disks in the disk stack. The ramp assembly is attached to the base. An actuator assembly is movably attached to the base of the disk drive. The actuator assembly includes one or more arms. A load spring is attached to the arm of the actuator. In some instances two load springs are attached to the arm of the actuator. A slider is attached to the load spring. Sliders have a backside surface and an air bearing surface. The air bearing surface includes an arrangement of rails and cavities which form high pressure areas and low pressure areas. An opening or passage connects the air bearing surface the backside surface of the slider. A ring of compliant material is attached to the backside surface of the slider. The ring of compliant material is located around the opening. Also associated with the actuator is a tang used primarily to unload or load the slider. Unloading the slider removes the slider from a transducing position over the disk to a park position on the ramp and to move the slider back to a transducing position from the ramp. The tang has a first end attached to the load spring and a second free end. The tang includes a dimple positioned to engage the ring of compliant material and seal the opening on the backside surface of the slider. As the tang engages the ramp, the seal between the dimple and compliant ring around the opening is broken and the negative pressure area of the air bearing surface is pressurized.

Advantageously, the slider produces a high negative pressure while in transducing relation with respect to the disk. The suction force or negative pressure also releases early during the unloading process so that an impulse load is avoided. Avoiding the impulse load also avoids an excitation at the gimbal dimple and avoids any contact between the head and disk during unloading resulting from a late release of the suction force. As a result, the advantages associated with a high suction slider, namely the fly height sigma reduction, a flat fly profile, and less altitude sensitivity are available for smooth disks. The high suction sliders can be unloaded from the disk without the problem of the slider either slapping the gimbal dimple or the slider exciting the gimbal dimple.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
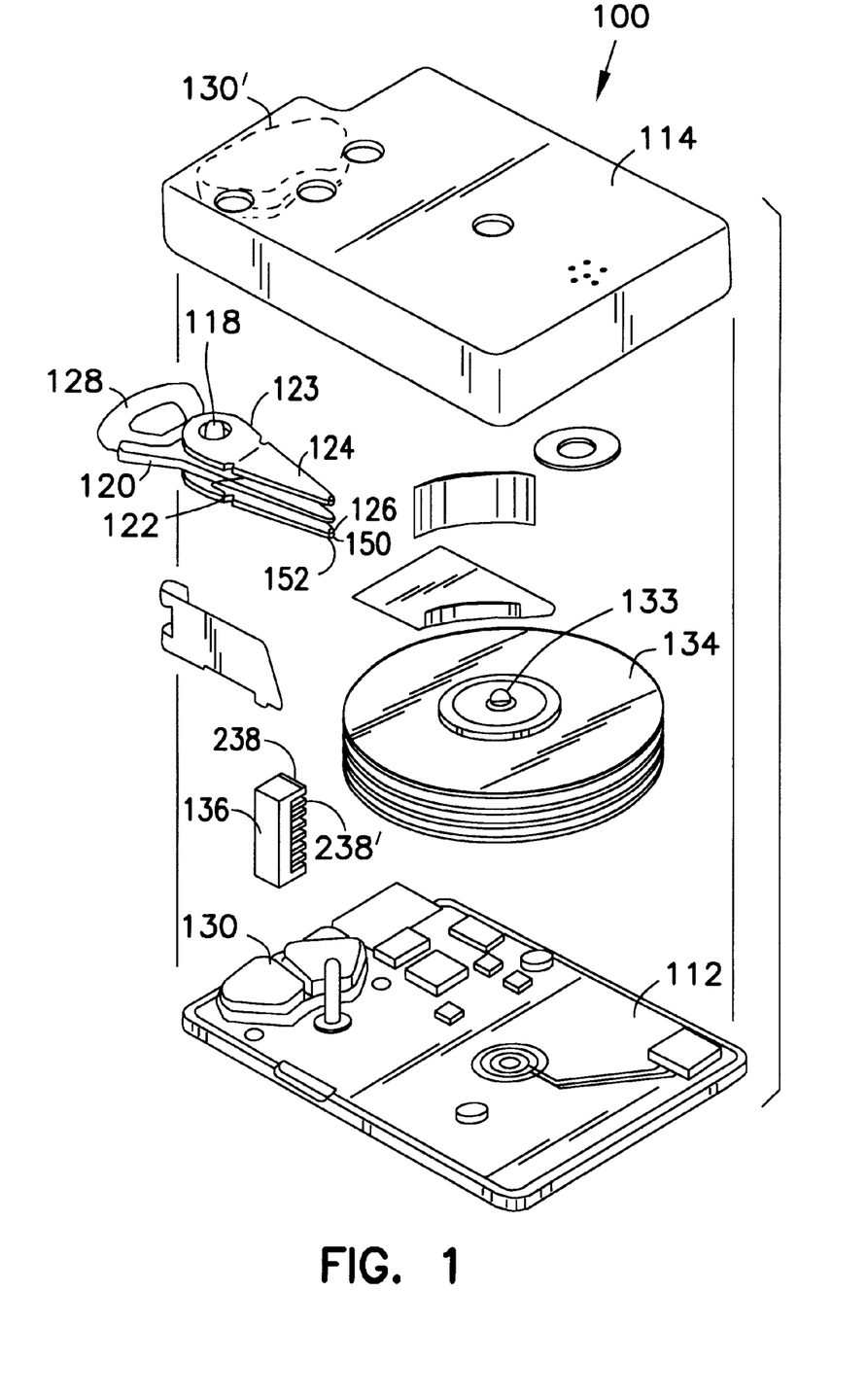
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disk 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
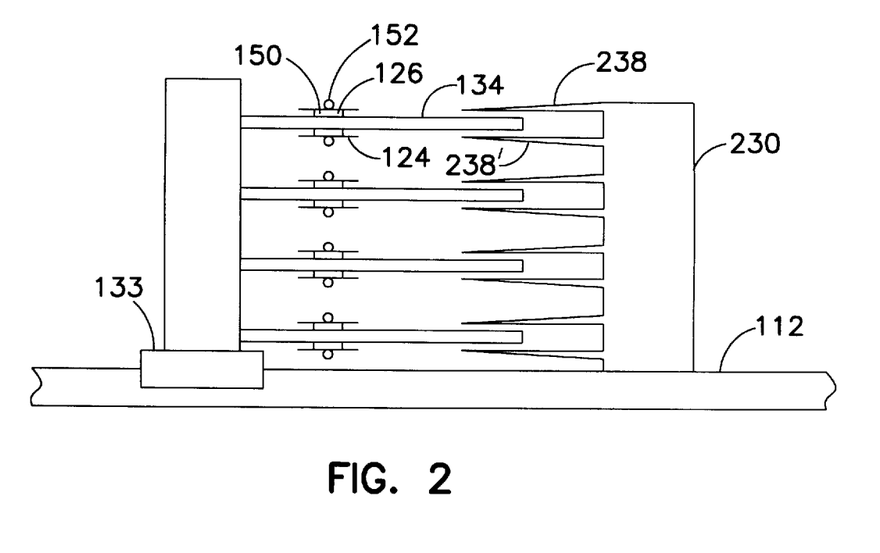
FIG. 2 is a side view of a disk drive having a ramp structure.

Also attached to the base 112 is a ramp structure 136. FIG. 2 is a side view of a disk drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disk and a ramp 238' for a bottom surface of the disk 134. The ramp portion 238 is for the loading and unloading the transducer from the top surface of a disk 134 and the ramp portion 238' is for loading and unloading a transducer from the bottom surface of a disk 134. The disk drive shown in FIG. 2 has four disks. Each disk 134 has two surfaces so there are a total of eight disk surfaces within the disk drive shown. Only one disk and set of ramps 238 and 238' are labeled. The other disks and ramps are similar to the labeled disk 134 and set of ramps 238 and 238'. The ramp structure 136 shown in FIG. 2 is fixed to the base of the disk drive. The ramp structure can be formed as one unitary part or can be assembled from a number of different parts. For example, the ramp structure 136 shown could be comprised of four parts. Each part would include a set of ramps 238 and 238' and a main body 230 to which the ramps 238 and 238' are attached. A portion of each of the ramp portions 238 and 238' of the ramp is positioned over the disk 134. It should be noted that this invention could also be used on ramps that rotate in and out of a load/unload position.

Also shown in FIG. 2 are the load springs 124, which are referred to by some as load beams or suspensions, and the attached load tangs 152. The load tangs 152 are attached to the load springs 124. The slider 126 and transducer 150 carried by the slider are not illustrated in FIG. 2 for the sake of clarity. All the load springs 124 and tangs 152 are attached to the actuator. Moving the actuator assembly 120 moves all the load springs 124 and load tangs 152. In operation, the actuator assembly 120 is moved to a park position when the disk drive is powered down. Moving the actuator to the park position causes the load tangs 152 associated with each load spring 124 to ride up the ramp 238 or 238' associated with the surface of the disk 134. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk. The load springs 124, load tangs 152 sliders 124 and transducers 150 of the disk drive are shown in a transducing position in FIG. 2. It should be noted that much of the actuator assembly 120 has been eliminated from FIG. 2 for the sake of clarity.

Figure 3:
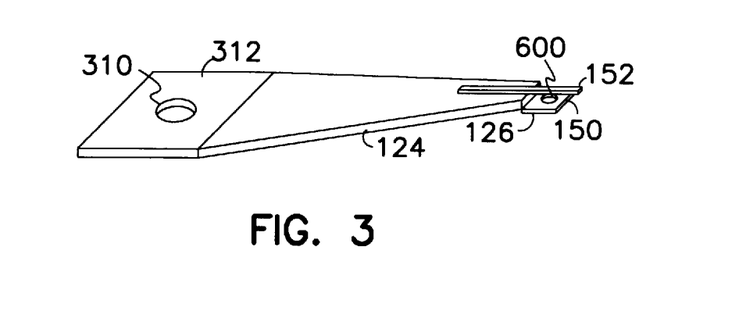
FIG. 3 is a perspective view of a load beam and load tang.

FIG. 3 is a perspective view of a load spring 124 and tang 152. The load spring 124 is a triangular structure which acts as a cantilevered spring to place a small load onto the slider 126 when the slider 126 is in transducing relationship with the disk 134. The load spring 124 is attached at its wider end to an actuator arm 123. The load spring 124 shown in FIG. 3 has a swage opening 310 and a swage plate 312 in the wider end. The swage opening 310 and swage plate 312 are used to attach the load spring 124 by a process referred to as swaging. Other attachment methods may also be used without departing from the spirit of this invention. The tang 152 is attached to a free end 320 of the load spring 124. The tang 152 is shown as an elongated cylinder. Also attached to the load spring 124 is the slider 126. The transducer 150 is carried by or within the slider 126. The tang 152 includes a gimbal dimple 600.

Figure 4:
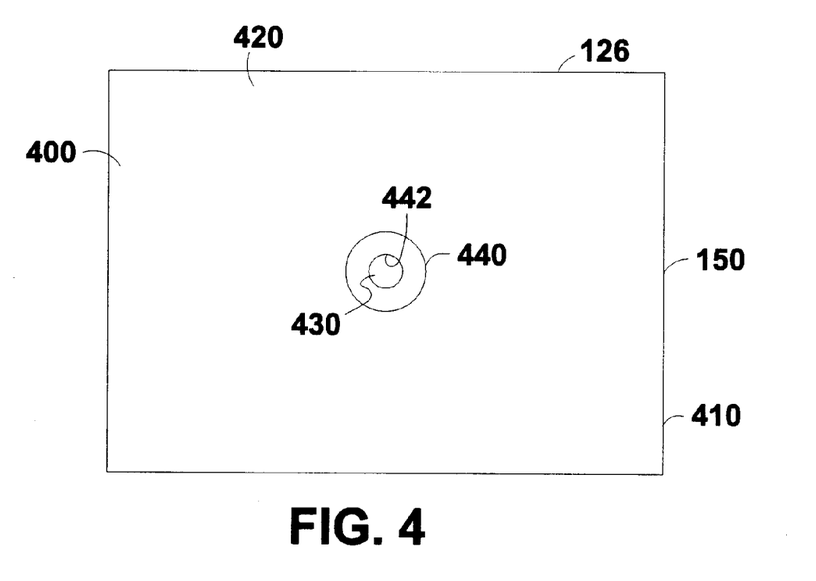
FIG. 4 is a top view of the slider.

FIG. 4 is a top view of the slider 126. The slider 126 includes a leading edge 400 and a trailing edge 410. When the slider 126 is in transducing relation with the disk (not shown in FIG. 4), the slider 126 flies or passes over the disk with the leading edge 400 facing forward. The slider 126 also includes a gimbaling surface 420. The gimbaling surface 420 is the surface that the gimbal dimple 600 contacts while the slider 126 is in transducing relation with respect to the disk. The slider 126 also includes an opening 430. The opening 430 is positioned in the gimbaling surface 420 of the slider 126. The opening 430 passes through the thickness of the slider 126. Attached to the gimbal surface 420 is a ring of compliant material 440. The ring of compliant material has an opening 442 therein. The ring of compliant material is positioned so that it surrounds the opening 430 on the gimbal surface 420. It should be noted that the gimbal surface 420 is sometimes referred to as the back side of the slider. Thus, the gimbal surface 420 can also be referred to as the back side surface of the slider 126.

Figure 5:
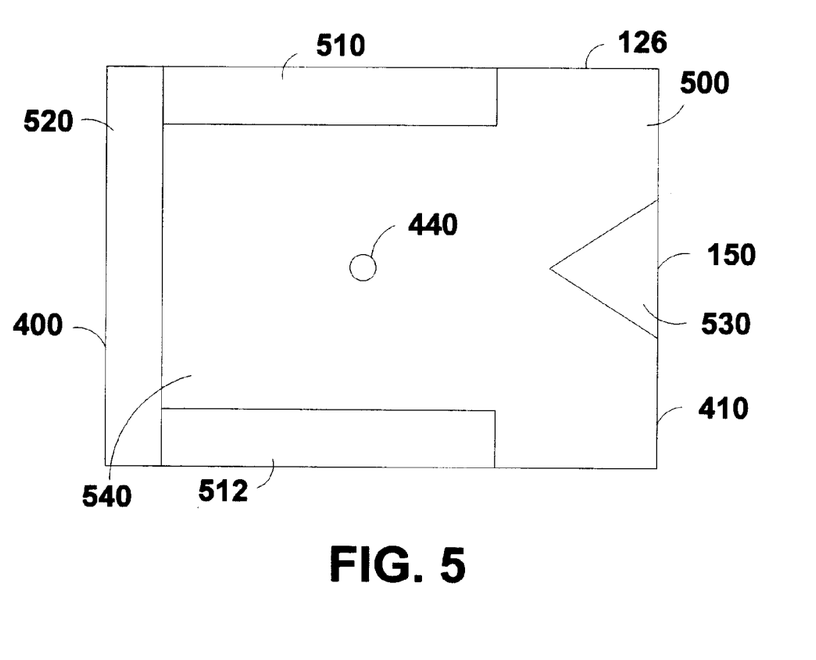
FIG. 5 is a bottom view of the slider which shows the air bearing surface.

FIG. 5 is a bottom view of the slider 126 which shows an air-bearing surface 500. The air-bearing surface 500 is the portion of the slider 126 which is nearest to the disk 134 (shown in FIG. 6). The air-bearing surface 500 includes a first side rail 510 and a second side rail 512 which are located near the sides of the slider 126. The air-bearing surface 500 also includes a leading tapered step 520 which is positioned near the leading edge 400 of the slider 126. The air-bearing surface 500 also includes a center pad 530 which is positioned near the trailing edge 410 of the slider 126. Between the side rail 510 and the side rail 512 and the leading tapered step 520, is a cavity or slightly depressed area 540. When the disk 134 is rushing past the air-bearing surface 500 of the slider 126, there are high pressure areas and low pressure areas formed at the air-bearing surface 500. The high pressure areas include the leading tapered step 520, the first side rail 510 and the second side rail 512. Another high pressure area is the center pad 530. Air rushing past the cavity 540 produces a negative pressure or suction force. As a result, the pressure in the cavity 540 area is low and, therefore, the cavity is referred to as the low pressure area of the air-bearing surface 500. A high suction slider 126 is one that produces a relatively high negative pressure area 540. High suction bearings, as mentioned previously, are very desirable since there is less variance in fly height when using a high suction bearing and since the fly height profile is relatively flat despite the fact that the slider 126 is positioned at various radial positions from the center of the disk 134. In addition, the high suction air-bearing sliders 126 have less altitude sensitivity. It should be noted that the opening 440 passes from the back side or gimbal surface 420 of the slider to the cavity 540 of the air-bearing surface. Put another way, the opening 440 passes from the back side surface 420 to the low pressure area of the air-bearing surface 500.

Figure 6:
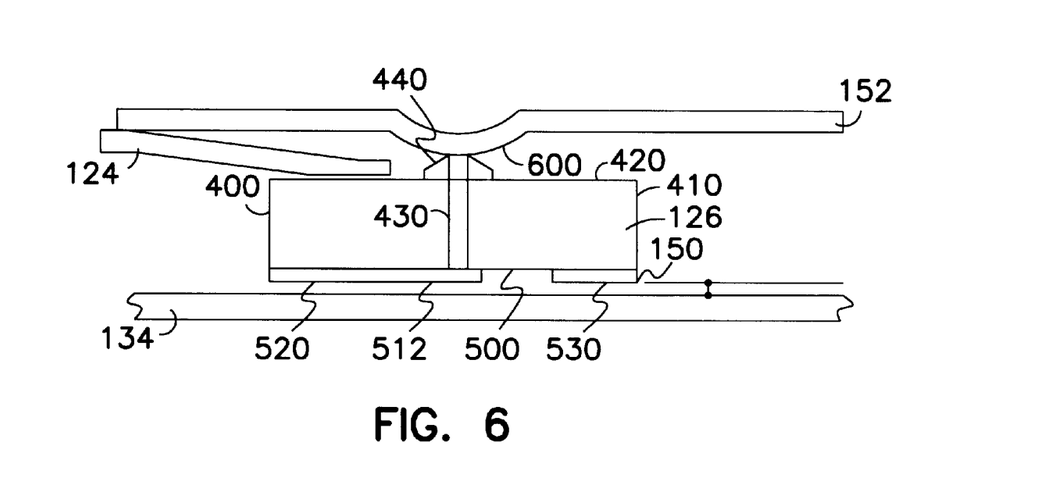
FIG. 6 is a cutaway side view of the slider with the dimple of the load beam sealing the opening in the slider.

FIG. 6 is a cutaway side view of the slider 126 with a dimple 600 of the load beam sealing the opening 430 in the slider 126. As shown in FIG. 6, the slider 126 is attached to the load spring 124. Could be done either way. A hole in the figure could be aligned to a pre-existing hole in the slider. Also attached to the load spring 124 is the tang 152. The dimple 600 in the tang 152 is positioned so that it rests upon the ring of compliant material 440 which rings or surrounds the opening 430 at or near the gimbaling or back side surface 420 of the slider 126. The load spring, as well as the tang 152 to which it is connected, exert a gram force onto the slider 126. As a result, the tang 152 also exerts a force onto the compliant ring 440. The ring of compliant material conforms to form a seal. The seal formed allows the air-bearing surface 500 to maintain a low pressure area as well as high pressure area. As mentioned previously, the low pressure area is formed in the cavity area 540 (shown in FIG. 5). Thus, during normal operation as the slider 126 is flying at a low fly height with respect to the disk 134, the dimple 600 of the load tang seals the opening 430 between the air-bearing surface 500 and the back side or gimbaling surface 420. Also, the slider 126 is able to move or gimbal on the gimbal dimple 600. The amount of roll pitch or pitch that must be accommodated is also accommodated by the ring of compliant material 440 so that the opening 430 remains sealed.

Figure 7:
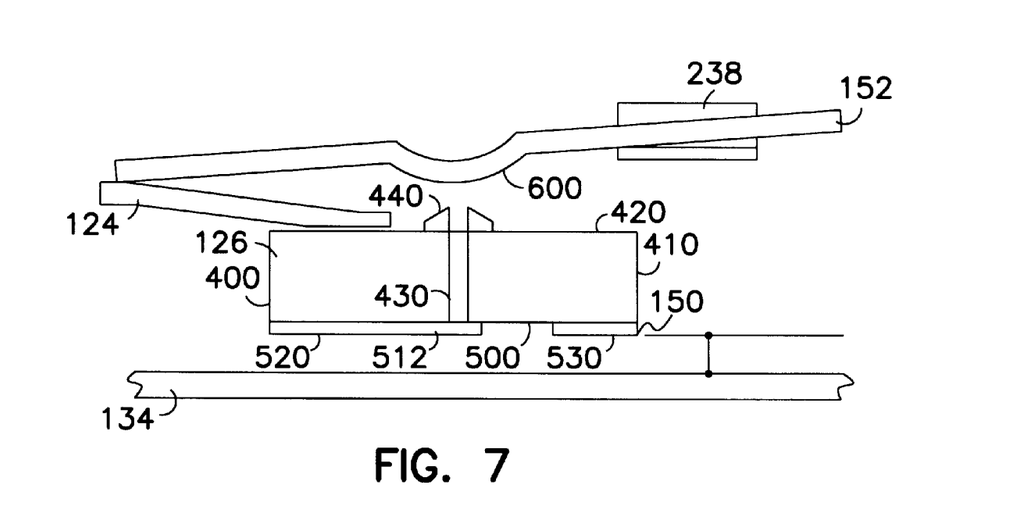
FIG. 7 is a cutaway side view of the slider as the actuator is unloading the slider from the disk shortly after the dimple of the load beam has been removed from the opening to break the seal around the opening in the slider.

FIG. 7 is a cutaway view of the slider 126 as the actuator assembly 120 is unloading the slider 126 from the disk 134. As shown in FIG. 7, the tang 152 is engaging or beginning to engage the ramp 238 of the disk drive. As the tang 152 engages the ramp 238, the tang 152 is moved away from the slider 126. When the tang 152 moves away from the slider, the gimbal dimple 600 within the tang 152 moves away from the ring of compliant material 440. The result is that the seal on the opening 430 is broken during the unloading process or as the unloading process begins. As a result of the opening 430 being unsealed, the air in the disk enclosure passes through the opening 430 to the negative pressure area or cavity 540 at the air-bearing surface. The result is that the slider 126 does not impact the suspension or load spring 124.

In an actuator assembly that includes a load spring 124, a slider 126 and a flexure attached to the load spring 124. The flexure is in turn attached to the slider 126. In such a system, the flexure would include a dimple. During assembly, the flexure would be aligned to the opening 430 in the slider 126. As the tang 152 on the load spring 124 rides up the ramp, the seal between the opening 430 and the dimple is broken to pressurize the cavity in the slider. During normal operation, the dimple on the flexure seals the opening 430.

To fabricate the opening 440 in the slider 126, a pulsed laser, such as an Excimer laser, is used to cut or blast through the thickness of the slider 126. The compliant material can be placed before or after the hole is made in the slider 126. In the preferred embodiment, the opening 440 is formed in the slider 126 and then a thin film of compliant material is deposited around the hole. Preferably, the compliant material is polymer-based. The polymer based material is placed around the opening 430 after the opening 430 is laser cut. Placing the polymer around the opening after laser cutting prevents compromising the material as a result of the extreme heat. In addition, debris generation is kept to a minimum. In another embodiment, the opening could be lapped so that a compliant material would not be needed.

Advantageously, the slider produces a high negative pressure while in transducing relation with respect to the disk. The suction force also releases early during the unloading process so that an impulse load is avoided. Avoiding the impulse load also avoids an excitation at the gimbal dimple and avoids any contact between the head and disk during unloading resulting from a late release of the suction force. As a result, the advantages associated with a high suction slider, namely the fly height sigma reduction, a flat fly profile, and less altitude sensitivity are available for smooth disks. The high suction sliders can be unloaded from the disk without the problem of the slider either slapping the gimbal dimple or the slider exciting the gimbal dimple.

Figure 8:
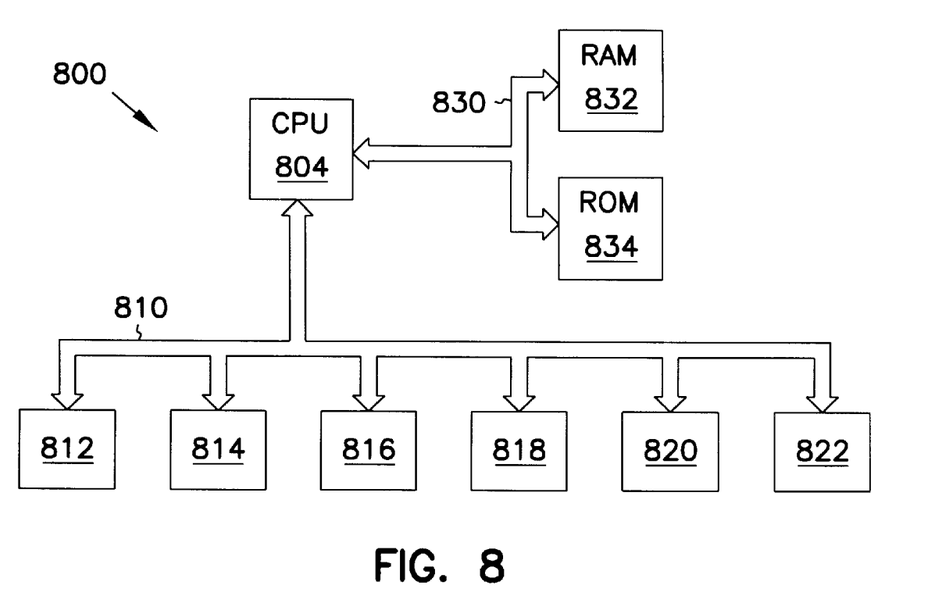
FIG. 8 is a schematic view of a computer system.

FIG. 8 is a schematic view of a computer system. Advantageously, the invention is well-suited for use in a computer system 800. The computer system 800 may also be called an electronic system or an information handling system and includes a central processing unit, a memory and a system bus. The information handling system includes a central processing unit 804, a random access memory 832, and a system bus 830 for communicatively coupling the central processing unit 804 and the random access memory 832. The information handling system 802 includes a disk drive device which includes the ramp described above. The information handling system 802 may also include an input/output bus 810 and several devices peripheral devices, such as 812, 814, 816, 818, 820, and 822 may be attached to the input output bus 810. Peripheral devices may include hard disk drives, magneto optical drives, floppy disk drives, monitors, keyboards and other such peripherals. Any type of disk drive may use the slider having an opening therein for releasing the negative pressure produced by an air bearing surface.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A head gimbal assembly for a disk drive comprising:
   a load spring;
   a slider attached to the load spring, said slider further comprising:
      a backside surface, said load spring attached to the backside;
      an air bearing surface, said slider having an opening therein, said opening located between the air bearing surface and the backside surface of the slider; and
   a tang positioned near the backside surface of the slider, said tang including a dimple, said dimple positioned to cover the opening on the backside surface of the slider.

2. The head gimbal assembly of claim 1, wherein said opening on said backside surface of said slider further includes a ring of compliant material located around said opening.

3. The head gimbal assembly of claim 1, wherein the end of the opening toward the air bearing surface is unobstructed.

4. The head gimbal assembly of claim 1, wherein said air bearing surface of said slider includes a plurality of cavities and a plurality of rails.

5. The head gimbal assembly of claim 1, wherein said load spring is a triangular shape, and said tang is a cylindrical shape.

6. A head gimbal assembly for a disk drive comprising:
   a load spring;
   a slider attached to the load spring, said slider further comprising:
      a backside surface, said load spring attached to the backside;
      an air bearing surface, said slider having an opening therein, said opening located between the air bearing surface and the backside surface of the slider;
   a ring of compliant material located around the opening, said ring attached to the backside surface of the slider; and
   a tang having a first end attached to the load spring and a second free end, said tang including a dimple, said dimple positioned to engage the ring of compliant material and seal the opening on the backside surface of the slider.

7. An information handling system comprising:
   a base;
   a disk rotatably attached to said base;
   an actuator assembly movably attached to said base said actuator assembly further comprising:
      a load spring;
      a slider attached to the load spring, said slider further comprising:
         a backside surface, said slider attached to the backside surface; and
         an air bearing surface, said slider having an opening therein, said opening located between the air bearing surface and the backside surface of the slider;

a transducer attached to said slider, said actuator assembly placing the slider in a transducing position with respect to said disk; and a tang attached to said load spring, said tang including a dimple, said dimple positioned to cover the opening on the backside surface of the slider.

8. The information handling system of claim 7 further comprising:

a ring of compliant material attached to the backside surface of the slider, said ring located around the opening, said tang having a first end attached to the load spring and a second free end, said tang including a dimple, said dimple positioned to engage the ring of compliant material and seal the opening on the backside surface of the slider.

9. The information handling system of claim 8 further comprising a ramp attached to said base, said second free end of the tang engaging the surface of the ramp when the actuator moves the transducer from the transducing position to the park position to break the seal between the dimple and the opening of the slider.

10. The information handling system of claim 7, wherein said actuator includes an arm, further wherein said arm of said actuator is connected to said load spring.

11. The information handling system of claim 10, wherein said gimbal assembly includes a plurality of said actuator.

12. A method for unloading a slider from a transducing position over a disk in a disk drive to a ramp, the slider having a backside surface and an air bearing surface with a low pressure area and a sealed opening between the backside surface and the air bearing surface, said unloading method comprising the steps of:

moving the slider toward a ramp; and breaking a seal associated with the sealed opening as the slider engages the ramp.

* * * * *